Patented May 30, 1939

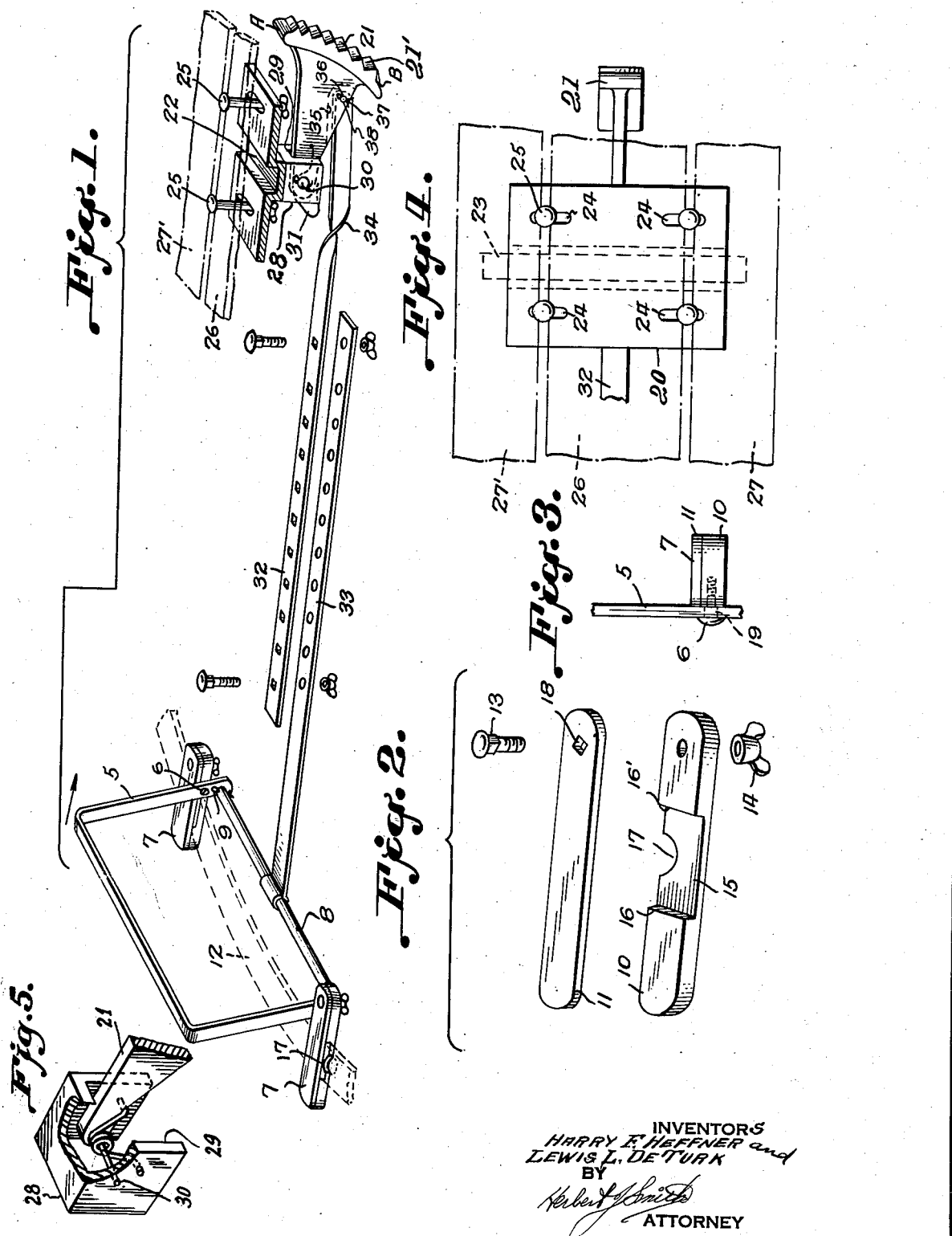

2,160,502

UNITED STATES PATENT OFFICE 2,160,502

UNIVERSAL SLED BRAKE

Harry F. Heffner and Lewis L. De Turk,
Kearny, N. J.

Application January 19, 1937, Serial No. 121,272

3 Claims. (Cl. 188—8)

This invention pertains to a brake and more particularly to a brake adapted to be used on vehicles such as a sled. The device is adaptable for use as an attachment on sleds of various sizes.

Heretofore, brakes of the general nature to which this invention relates, have been designed for a particular size sled, and to apply one brake on a sled which was longer, required many changes in the device per se, thereby making it impossible to transfer the brake to sleds of different lengths.

Further, the conventional brake was constructed as an integral part of the sled itself, and discarding the sled therefore required discarding the brake.

This invention eliminates the above objections in that it may be readily installed or removed, without the use of tools, and furthermore no drilling or cutting of metal or wood is required.

Therefore, an object of this invention is to provide a brake which may be attached to a sled without the use of tools.

A further object is to provide a sled brake which is adaptable for use on sleds of various sizes.

A still further object is to provide a brake of more efficient and economical construction, being universal in its application to sleds, of various dimensions, more particularly to sleds of various lengths.

A more comprehensive understanding of the invention may be had from the drawing in which:

Figure 1 is a perspective view of the invention, partly broken away.

Figure 2 is an exploded view in perspective of one of the brace clamps.

Figure 3 is a front view, partly broken away, showing the handle as connected to a brace clamp.

Figure 4 is a top view of the brake shoe and its supporting plate in relation to the sled.

Figure 5 is a detail view showing the mounting of the brake shoe in relation to the shoe carrying member.

Referring to the drawing, in particular to Figure 1, 5 is a handle or horizontal lever pivoted at both sides by screw members 6, which members are threadedly secured to the brace clamps generally indicated by the numeral 7. The lower ends of the handle 5 are provided with holes which receive a rod 8 extending from the outside of one handle's projecting portions, to the outside of the other handle projection. Any convenient manner of preventing the rod from lateral movement may be provided, but is here shown as cotter pins 9 inserted in rod 8. The rod is permitted to be rotated in its bearings to prevent undue friction when the handle 5 is moved to actuate the brake shoe.

Figure 2 shows the brace clamp 7 having a lower portion 10 which has a cut out section 15, to fit on the sled brace 12, shown dotted in Fig. 1. A cap 11 is adapted to cover the lower portion 10 and by utilization of a screw 13 and a wing-nut 14, the said clamp is affixed to the sled brace to hold the handle 5 securely against any substantial lateral movement. The lower portion on said clamp has a semicircular cut out section at 17, to permit the clamps to fit properly around a bolt head (shown dotted) in the event one is present in the particular sled construction to which this invention may be applied.

It will be noted that the cut out section 15 of part 10 is not cut exactly at right angles to the length of the lower portion of the clamp, but obliquely as shown at 16'—16', to more definitely fit on, and clamp to the arcuate sled brace 12. The square hole 18 fits the square shoulder of the bolt 13, thereby assisting to tighten the wing nut 14 securely.

Figure 3 shows the vertical portion of the handle 5 in part, in relation to the right hand side brace clamp, with the pivot 6 having a round shoulder 19, said pivot being screwed securely into the lower portion of clamp 7, while the shoulder 19 provides pivoted movement of the handle 5 on the pivot pin 6. The brace clamps, it will be noted, are similar in function, but are adapted for use on the opposite sides of the sled, each being substantially a mirror image of the other.

A universal clamp plate 20 used primarily to hold the brake shoe 21, has a groove 22, which fits over a cross piece of the sled 23, shown dotted in Figure 4. The clamp plate has slots therein which receive bolts such as 25, said slots being of sufficient length to permit the clamp to be fitted on sleds utilizing center strips 26 of various width. The heads of the bolts 25 are of sufficient diameter to overlap and engage the adjacent sled strips 27—27', the threaded ends of said bolts protruding through the under side of the plate 20, through the elongated slots 24. Wing-nuts 25a threaded on bolts 25 securely clamp on the plate against the sled strips 26—27—27' and over the cross-piece 23, thereby preventing lateral or longitudinal movement of said plate.

A projection 28 on the shoe carrying member 20, has a slot 29, which receives one end of the shoe 21. The opposite end of the shoe has a serrated edge 21', which contacts and engages, the ice or snow, the serrated edge being a greater distance from its fulcrum 30 at point A than at point B, and of such relation as to the distance to the ground from the fulcrum 30, that the rear portion of the sled runners may be raised from contact with the surface of the snow or ice by sufficient rotation of shoe member 21. A spring 31 is mounted between the projection 28 of the shoe carrying member 20 and the brake shoe member 21 and is adapted to act upon the brake shoe member 21 so that the same moves under tension of the spring when the brake is applied. The spring 31 is of sufficient strength to retract the shoe and restore it to normal position when the brake handle is released after application.

Two tie rods 32 and 33 are employed to connect the rod 8 to the shoe 21. One end of the tie rod 33 is securely fastened to the middle of the rod 8, while one end of the tie rod 32 is twisted at 34 to change the flat side from a horizontal to a vertical position, enabling the extreme end of said rod to fit into a slot 35, shown dotted. Said tie rod end has a hole therein, to conform in size to holes 36 in the shoe, and said holes in the slotted portion of the shoe and tie rod are adapted to receive a rotatable pin 37, which pin is secured against substantial lateral movement by cotter pins 38. The tie-rods 32 and 33 have holes equally and uniformly spaced along their lengths to permit the lengthening or shortening of the tie-rod connection, permitting adjustment on sleds of various lengths, said tie rods being secured together by bolts having square shoulders to fit in the upper tie rod holes, and said bolts being held in place by wing-nuts.

It will be understood from the foregoing that the present invention can be adjusted for various sleds in commercial use and readily attached or detached therefrom without departing from the spirit of the invention.

In operation, when the handle 5 is moved in the direction of the arrow, the leverage between the fulcrum 6 and bar 8 will cause the tie rods 32 and 33 to move forward rotating the shoe 21 about pivot 30 and bringing the brake shoe into forcible contact with the snow or ice surface. When the handle 5 is released the spring 31 will cause restoration of the handle and brake shoe, to their respective normal positions.

Certain specific detailed features of the invention have been herein set forth, but the invention is not limited thereto, as changes and alterations may be and may become apparent to those skilled in the art without departing from the spirit thereof as defined by the subjoined claims.

Having thus described our invention, what we claim as new and desire to secure by Letters Patent of the United States is:—

1. In a braking device for a sled, a pair of clamps, means for securing said clamps to a sled member, a handle having two projecting arms, said arms being movably mounted on said clamps, a pivotal bar mounted in said projecting arms, a shoe carrying member having elongated slots therein for adjustably securing said carrying member to a sled, a brake shoe movably connected to said carrying member, resilient means for holding said shoe in a retracted position, and an adjustable member connecting said pivotal bar to said shoe.

2. An attachable braking member having two clamps, each comprising a lower portion and a cap member, means for rigidly securing said clamps on a sled member, a handle pivotally mounted on said clamps, a brake shoe having a serrated edge for surface contact, a carrying member, means for securing said shoe to said carrying member, and an adjustable operating member, connected intermediate said shoe and said handle.

3. An attachable braking device comprising a pair of clamps, a portion of each clamp having a groove conforming to the general shape of a sled member to which said clamp is secured, a handle movably mounted on said clamps, a brake shoe carrying member, and a brake shoe mounted thereon, and an adjustable member operatively connecting said shoe and said handle.

HARRY F. HEFFNER.
LEWIS L. DE TURK.